(12) United States Patent
Teng

(10) Patent No.: US 9,288,379 B2
(45) Date of Patent: Mar. 15, 2016

(54) SYSTEM AND METHOD FOR CONTINUOUS AUTO FOCUS WITHIN CAMERA MODULE

(71) Applicant: OmniVision Technologies, Inc., Santa Clara, CA (US)

(72) Inventor: Chih-Hao Teng, Hsinchu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 84 days.

(21) Appl. No.: 14/206,855

(22) Filed: Mar. 12, 2014

(65) Prior Publication Data

US 2015/0264247 A1 Sep. 17, 2015

(51) Int. Cl.
- H04N 5/232 (2006.01)
- G02B 7/10 (2006.01)
- G02B 7/36 (2006.01)
- G03B 13/36 (2006.01)

(52) U.S. Cl.
CPC ............ *H04N 5/23212* (2013.01); *G02B 7/102* (2013.01); *G02B 7/36* (2013.01); *G03B 13/36* (2013.01)

(58) Field of Classification Search
None
See application file for complete search history.

(56) References Cited

U.S. PATENT DOCUMENTS

| | | | | |
|---|---|---|---|---|
| 5,200,828 A * | 4/1993 | Jang et al. | | 348/345 |
| 5,298,933 A * | 3/1994 | Chigira | | 396/82 |
| 5,337,084 A * | 8/1994 | Nakamura | | 348/345 |
| 5,455,649 A * | 10/1995 | Yamada et al. | | 396/87 |
| 5,574,502 A * | 11/1996 | Haruki | | 348/347 |
| 5,604,538 A * | 2/1997 | Kaneda et al. | | 348/353 |
| 5,612,740 A * | 3/1997 | Lee et al. | | 348/345 |
| 6,094,223 A * | 7/2000 | Kobayashi | | 348/354 |
| 6,163,340 A * | 12/2000 | Yasuda | | 348/345 |
| 2004/0012709 A1 * | 1/2004 | Hirai | | 348/345 |
| 2004/0036793 A1 * | 2/2004 | Kanayama | | 348/345 |
| 2004/0036794 A1 * | 2/2004 | Kanayama et al. | | 348/345 |
| 2004/0165276 A1 * | 8/2004 | Yahagi et al. | | 359/629 |
| 2006/0045509 A1 * | 3/2006 | Sasaki | | 396/137 |
| 2006/0171699 A1 * | 8/2006 | Nakai et al. | | 396/125 |
| 2007/0052836 A1 * | 3/2007 | Yamada et al. | | 348/345 |
| 2008/0018777 A1 * | 1/2008 | Higashino | | 348/353 |
| 2008/0031611 A1 * | 2/2008 | Konishi | | 396/102 |
| 2009/0175611 A1 * | 7/2009 | Kiyamura et al. | | 396/133 |
| 2009/0190910 A1 * | 7/2009 | Yasuda et al. | | 396/133 |
| 2010/0177236 A1 * | 7/2010 | Suzuki et al. | | 348/349 |
| 2010/0232775 A1 * | 9/2010 | Okamoto et al. | | 396/81 |
| 2011/0043678 A1 * | 2/2011 | Ueda et al. | | 348/345 |
| 2011/0158624 A1 * | 6/2011 | Sasaki | | 396/123 |
| 2012/0051727 A1 * | 3/2012 | Tanaka | | 396/49 |
| 2013/0021516 A1 * | 1/2013 | Kikuchi | | 348/345 |
| 2013/0250162 A1 * | 9/2013 | Sasaki | | 348/345 |
| 2013/0308039 A1 * | 11/2013 | Uchiyama | | 348/345 |
| 2014/0375869 A1 * | 12/2014 | Hagiwara | | 348/345 |
| 2015/0085177 A1 * | 3/2015 | Okada | | 348/345 |
| 2015/0130988 A1 * | 5/2015 | Uenishi | | 348/349 |
| 2015/0138429 A1 * | 5/2015 | Ogura et al. | | 348/349 |
| 2015/0163395 A1 * | 6/2015 | Konishi et al. | | H04N 5/23212 |

* cited by examiner

*Primary Examiner* — Michael Osinski
(74) *Attorney, Agent, or Firm* — Lathrop & Gage LLP

(57) ABSTRACT

A continuous autofocus system includes an image generation portion including a lens, an autofocus voice coil motor for translating the lens with respect to an image sensor capable of generating image data. The autofocus system further includes a driver IC for controlling the autofocus voice coil motor based on the image data, wherein the image data is directly transmitted to the driver IC thereby continuously maintaining a focused image generated by the image generation portion.

10 Claims, 3 Drawing Sheets

SYSTEM AND METHOD FOR CONTINUOUS AUTO FOCUS WITHIN CAMERA MODULE

BACKGROUND

The embodiments disclosed herein relate to camera modules. Particularly, the embodiments disclosed herein relate to a continuous autofocus system within camera modules.

Camera modules are becoming increasingly popular within portable electronics. Not only are camera modules within stand-alone cameras, but they are in essentially all smartphones, tablets and PC computers. Camera modules include auto focus systems such that a particular camera module can focus on a specific object within a captured image.

Current autofocus systems require a time interval whereby the camera module is held stationary such that the camera can acquire an object and determine the correct focus configuration. This time interval is inefficient as current autofocus systems require 125 ms or more to find the best focus.

FIG. 1 depicts an exemplary prior art autofocus system 100 within a camera module. FIG. 2 depicts an exemplary prior art autofocus position calculation diagram utilized by autofocus system 100, of FIG. 1. FIGS. 1-2 are best viewed together with the following description.

Autofocus system 100 includes an image generation portion 102 having a lens 104 for capturing, via image sensor 106, and an autofocus voice coil motor (AF VCM) 108 for translating lens 104 to a focus position along a focus translation stage (not shown). AF VCM 108 is controlled via driver circuit 110. Driver circuit 110 is configured by image signal processor (ISP) 112. ISP 112 receives data, via an inter-integrated circuit ($I^2C$) Bus from image sensor 106 as described below with reference to FIG. 2.

ISP 112 controls AF VCM 108, via driver circuit 110, such that lens 104 is sequentially set to various position values 202. A contrast value of the image (i.e. sensed by image sensor 106) is taken at each position value 202 and a curve fitting algorithm is applied (i.e. within ISP 112) to determine curve fitting line 204. Peak 206 of curve fitting line 204 is then selected for the best focus position, whereby Driver circuit 110 controls AF VCM 108 to set lens 104 to a particular position. The time required to translate lens 104 to a series of position values 202 is inefficient.

SUMMARY OF THE INVENTION

In a first aspect, a continuous autofocus system for generating an image is described including an image generation portion having a lens, an autofocus voice coil motor, and an image sensor for generating contrast image data of an image. The continuous autofocus system further includes a driver integrated circuit (IC) for controlling the autofocus voice coil motor, thereby translating the lens with respect to the image sensor; wherein the driver IC directly receives the contrast image data such that the driver IC continuously maintains the focus of the image.

In a second aspect, a method for continuous autofocus when generating an image is described including the steps of generating, via an image sensor, contrast image data of an image; transmitting the contrast image data directly to a driver IC circuit; generating, within the driver IC circuit, a control signal based on the contrast image data; and, translating a lens based on the control signal to alter the focus of the image.

DETAILED DESCRIPTION OF THE DRAWINGS

Figure 3:
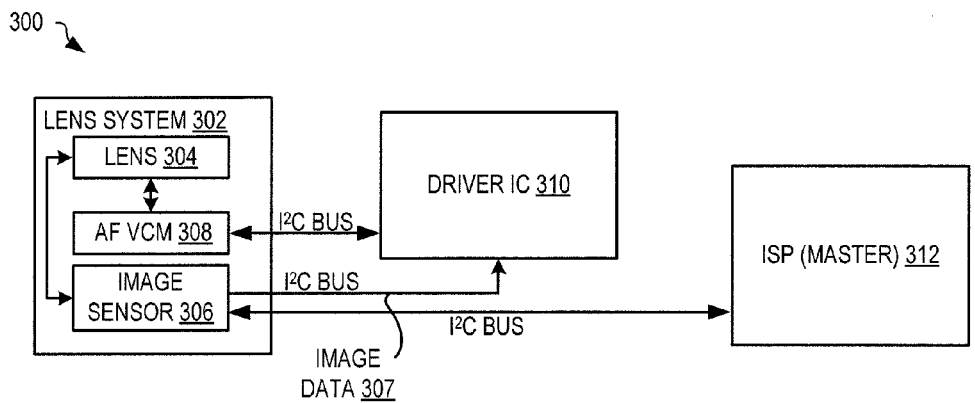
FIG. 3 depicts an exemplary autofocus system for continuously retaining autofocus of an image, in one embodiment.

FIG. 3 depicts an exemplary autofocus system for continuously retaining autofocus of an image, in one embodiment. Autofocus system 300 includes a image generation portion 302 having a lens 304, an autofocus voice coil motor 308, and an image sensor 306 for capturing an image translated through lens 304.

Lens 304 images light reflected on a scene onto image sensor 306. Lens 304 may include a single lens, or a plurality of lenses, located on a translation stage (not shown) for varying the distance of lens 304 from image sensor 306, such that image focus can be altered.

Image sensor 306 is for example a complementary metal-oxide-semiconductor (CMOS) sensor, and/or any other imaging sensors known in the art capable of sensing image contrast data.

Figure 1:
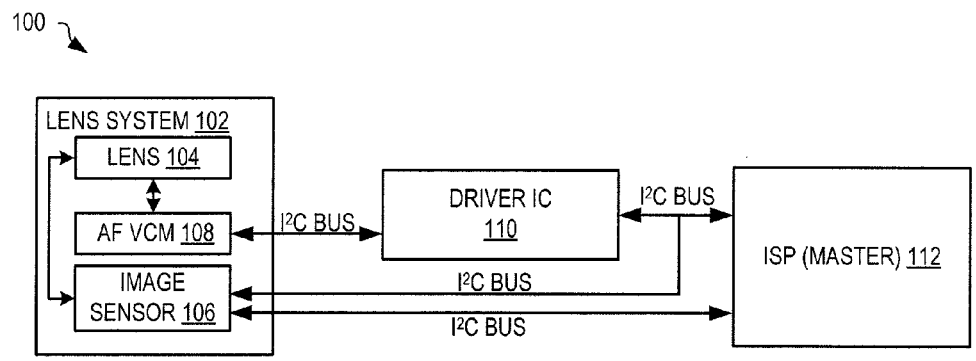
FIG. 1 depicts an exemplary prior art autofocus system within a camera module.
Figure 2:
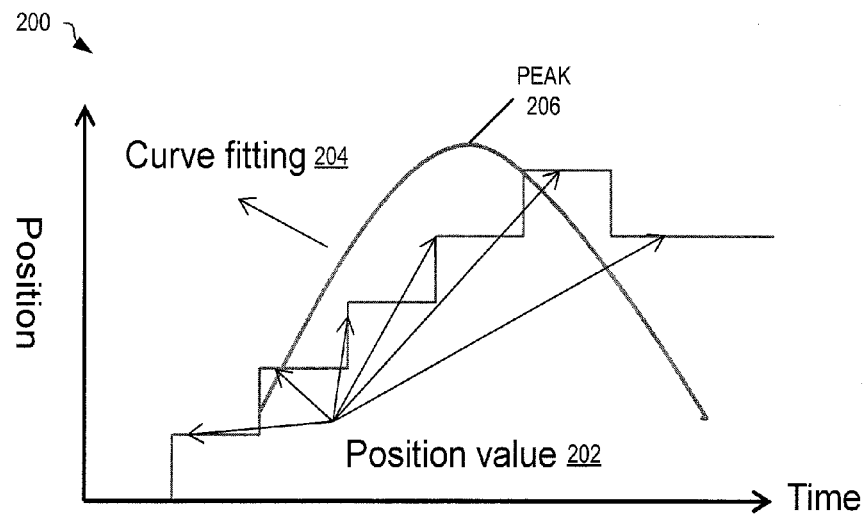
FIG. 2 depicts an exemplary prior art autofocus position calculation diagram utilized by the autofocus system of FIG. 1.

Image sensor 306 generates image data 307 from light imaged thereon by lens 304, and image data 307 is directly sent to a driver IC 310. For example, image data 307 includes contrast data of a sensed image and may be sent to driver circuit 310 via an $I^2C$ bus. Driver IC 310 controls AF VCM 308 to control the position of lens 304 relative to image sensor 306. Unlike the autofocus system in FIGS. 1-2, driver IC 310 is typically not controlled via an ISP 312. Image sensor 306 may continuously output image data 307. For example, at least one component of image data 307 may be high speed contrast data sent directly to driver circuit 310 such that driver circuit 310 automatically controls AF VCM 308 to keep lens 304 at the best focus position. In other words, autofocus system 300 does not require sequentially moving a lens to a series of lens positions and subsequently determining a best focus position.

By directly receiving image data 307 at driver IC 310, autofocus system 300 substantially reduces and/or eliminates the focusing time required to keep an image produced in focus. For example, driver IC 310 operates to automatically keep lens 304 in the best focus. By directly receiving image data 307 (i.e. image contrast data), driver IC 310 automatically controls AF VCM 308 such that the focus of an image produced by autofocus system 300 is above a focus threshold (e.g. is in best focus). Driver IC 310 does not need to sequentially set lens 304 at a plurality of focus positions and then determine the best focus position. To the contrary, driver IC 310 receives image data 307 and automatically controls AF VCM 308 until contrast image data 307 is above a particular focus threshold. Once the image data 307 is above a particular focus threshold, lens 304 is in an appropriate position such that the image is in focus.

Figure 4:
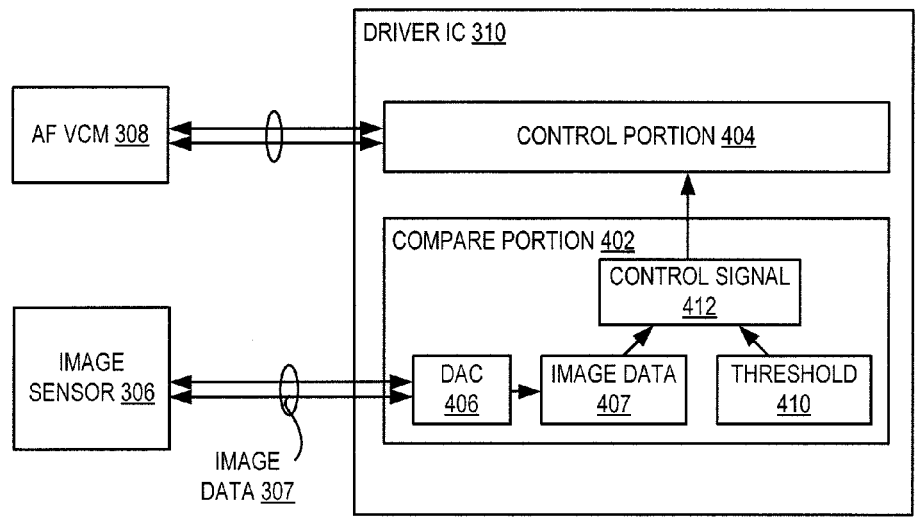
FIG. 4 depicts the driver IC of FIG. 3 in greater detail, in one embodiment.

FIG. 4 depicts the driver IC 310, of FIG. 3 in greater detail, in one embodiment. Driver IC 310 includes at least a compare portion 402 and a control portion 404. Image sensor 306 sends high speed image data 307 as a digital signal directly to compare portion 402 of driver IC 310. Within compare portion 402, image data 307 is converted to an analog signal via digital-to-analog converter 406 to generate analog image data

407. Analog image data 407 is for example an analog representation of high speed contrast data generated by image sensor 306.

Analog image data 407 is then compared to focus threshold 410, in real time, to generate control signal 412. For example, analog image data 407 is a voltage potential ranging from 0V to 1 V, wherein 0V indicates worst contrast and 1V indicates best contrast. Focus threshold 410 is for example a voltage potential corresponding to a minimum acceptable focus level. For example, where image data 407 ranges from 0V to 1V, focus threshold 410 may have a value of 0.9V. The value of focus threshold 410 may be predetermined based on the application of the particular autofocus system, and/or may be variably set by a user of the autofocus system.

On receipt of control signal 412, control portion 404 automatically controls AF VCM 308 such that the image data 407 is increased/decreased above/below focus threshold 410. For example, if image data 407 has a voltage potential below focus threshold 410, lens 304 is translated, via control of AF VCM 308 by driver IC 310, away from sensor 306 in a first direction. If the image data 407 voltage potential then increases, driver IC 310 continues to translate in the same direction until the voltage potential is equal to or greater than focus threshold 410. If the image data 407 voltage potential decreases, lens 304 is translated in a second direction opposite from the first direction. As discussed above, by directly sending image data 307 to driver IC 310 and automatically determining the position of best focus, autofocus system 300 substantially reduces and/or eliminates the time required to focus an image.

Figure 5:
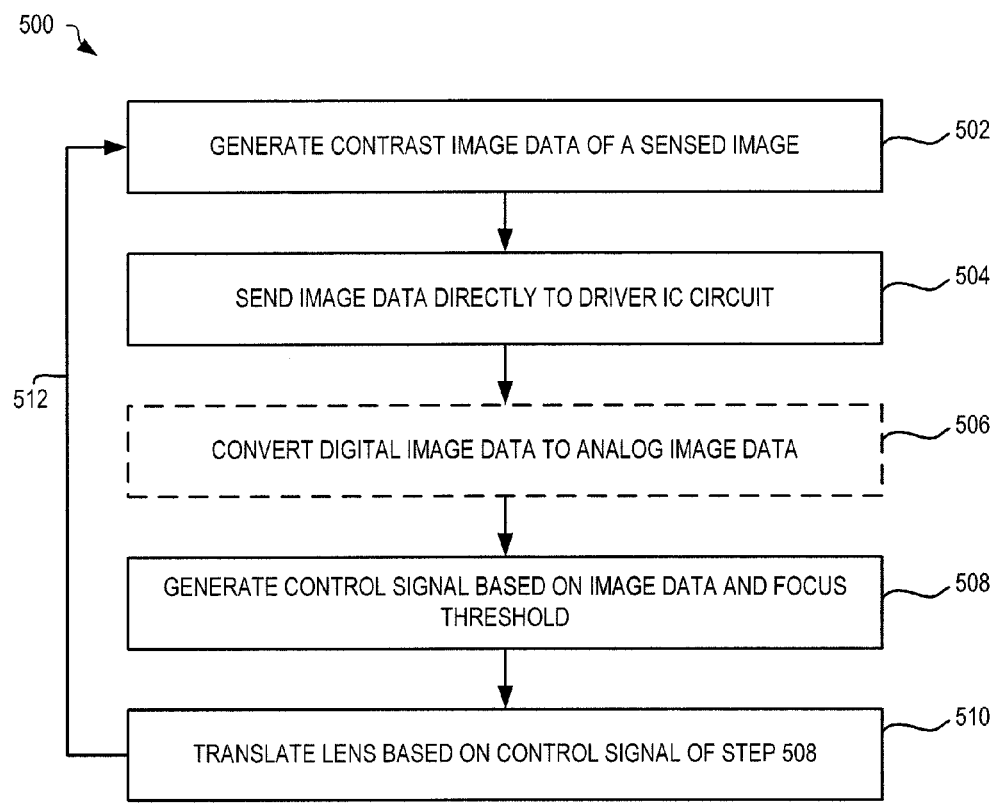
FIG. 5 depicts an exemplary method 500 for continuous autofocus, in one embodiment.

FIG. 5 depicts an exemplary method 500 for continuous autofocus, in one embodiment. For example, method 500 is implemented within continuous autofocus system 300, of FIGS. 3-4.

In step 502, method 500 generates contrast image data of an image sensed by an image sensor. In one example of step 502, image sensor 306 senses an image and generates high speed contrast image data 307 of the image.

In step 504, the contrast image data generated in step 502 is sent directly to a driver IC circuit. In one example of step 504, image data 307 is sent directly to compare portion 402 of driver IC circuit 310.

In optional step 506, the image data of steps 502-504 is converted from digital to analog. For In one example of step 506, digital-to-analog converter 406 converts digital high speed contrast image data 307 into analog high speed contrast image data 407.

In step 508, a control signal is generated based upon the image data collected in steps 502-508 and a focus threshold value. In one example of step 508, compare portion 402 compares image data 407 to focus threshold value-410 to generate control signal 412.

In step 510, a lens is translated based on control signal from step 508 such that the image data is above the focus threshold value. In one example of step 510, control portion 404 controls AF VCM 308 such that image data 407 voltage potential is greater than the value of focus threshold 410.

Steps 502 through 510 are repeated continuously, as indicated by loop 512, such that an image generated by method 500 is continuously autofocused. It will be appreciated that method 500 may be implemented in any single snapshot cameras, video cameras or any other type of image generation device.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A continuous autofocus system for generating an image, comprising:
   an image generation portion having a lens,
   an autofocus voice coil motor, and
   an image sensor for generating contrast image data of an image; and,
   a driver integrated circuit (IC) for controlling the autofocus voice coil motor, thereby translating the lens with respect to the image sensor;
   wherein the driver IC directly receives the contrast image data such that the driver IC continuously maintains the focus of the image,
   wherein the contrast image data is generated by the image sensor as a digital signal;
   the driver IC having a digital-to-analog converter for converting the digital contrast image data to analog contrast image data represented as a voltage potential.

2. The continuous autofocus system of claim 1, wherein the contrast image data is high speed contrast image data.

3. The continuous autofocus system of claim 1, wherein the driver IC controls the autofocus voice coil motor based on a control signal that is generated via a comparison of the contrast image data to a focus threshold value.

4. The continuous autofocus system of claim 1, wherein the control signal is generated by a comparison of analog contrast image data against a focus threshold value defined by a threshold voltage potential value.

5. The continuous autofocus system of claim 4, wherein the comparison occurs in real time without averaging a sequence of positions of the lens with respect to the sensor.

6. A method for continuous autofocus when generating an image, the method comprising:
   generating, via an image sensor, contrast image data of an image;
   transmitting the contrast image data directly to a driver IC circuit;
   generating, within the driver IC circuit, a control signal based on the contrast image data; and,
   translating a lens based on the control signal to alter the focus of the image;
   wherein the step of generating a control signal comprises:
   converting the digital contrast image data signal into an analog contrast image data signal such that contrast of the image is represented by an analog voltage potential.

7. The method of claim 6, wherein the step of generating contrast image data includes generating high speed contrast image data.

8. The method of claim 6, wherein the step of generating contrast image data includes generating a digital contrast image data signal.

9. The method of claim 6, wherein the step of generating a control signal further comprises:
   comparing the analog contrast image data signal against a focus threshold value represented by a focus voltage potential value.

10. The method of claim 6, wherein the steps of generating contrast image data, transmitting the contrast image data, generating the control signal, and translating the lens continuously repeat to automatically retain focus of the image.

* * * * *